United States Patent
Rangasamy et al.

(10) Patent No.: US 12,487,770 B2
(45) Date of Patent: Dec. 2, 2025

(54) APPLICATION ENVIRONMENT RECOVERY USING CLOUD-BASED IMMUTABLE STORAGE DEVICES

(71) Applicant: Commvault Systems, Inc., Tinton Falls, NJ (US)

(72) Inventors: Govindarajan Rangasamy, Holliston, MA (US); Sujai Subburayan Dakshinamoorthy, Coimbatore (IN); Chakkaravarthi Barathi Thangaraj, Coimbatore (IN)

(73) Assignee: Commvault Systems, Inc., Tinton Falls, NJ (US)

( * ) Notice: Subject to any disclaimer, the term of this patent is extended or adjusted under 35 U.S.C. 154(b) by 46 days.

(21) Appl. No.: 17/989,768

(22) Filed: Nov. 18, 2022

(65) Prior Publication Data
US 2023/0161497 A1    May 25, 2023

Related U.S. Application Data

(60) Provisional application No. 63/281,123, filed on Nov. 19, 2021.

(51) Int. Cl.
    *G06F 3/06* (2006.01)
(52) U.S. Cl.
    CPC .......... *G06F 3/0655* (2013.01); *G06F 3/0604* (2013.01); *G06F 3/067* (2013.01)
(58) Field of Classification Search
    CPC ....... G06F 3/0655; G06F 3/0604; G06F 3/067
    (Continued)

(56) References Cited

U.S. PATENT DOCUMENTS 9,176,773 B2    11/2015    Fries
10,402,090 B1    9/2019    Tsaur
(Continued)

OTHER PUBLICATIONS

DataScientist | IaaS vs IaC: Exploring Differences and Similarities | IaC or Infrastructure as Code (available at www.datascientest.com/en/iaas-vs-iac-exploring-differences-and-similarities, accessed Nov. 27, 2024) (emphasis added).
(Continued)

*Primary Examiner* — Gautam Sain
(74) *Attorney, Agent, or Firm* — Commvault Systems, Inc.

(57) ABSTRACT

An example method includes identifying cloud services of a distributed software system deployed in a cloud platform. The cloud services are specific to a first cloud account. Further, dependencies associated with the cloud services may be determined. Furthermore, metadata including the dependencies and application data associated with the cloud services are stored in one or more cloud-based immutable storage devices at defined intervals. Responsive to determining an anomaly in the distributed software system, the metadata associated with the cloud services may be retrieved from the cloud-based immutable storage devices. Cloud platform specific infrastructure as code (IaC) may be generated for the distributed software system based on the retrieved metadata. A second cloud account may be generated. The cloud platform specific IaC is executed to recover an application environment of the distributed software system in the second cloud account using the application data stored in the cloud-based immutable storage devices.

9 Claims, 11 Drawing Sheets

(58) Field of Classification Search
USPC .......................................................... 711/154
See application file for complete search history.

(56) References Cited

U.S. PATENT DOCUMENTS

| | | | |
|---|---|---|---|
| 10,649,861 B1 | 5/2020 | Natanzon | |
| 10,749,943 B1 | 8/2020 | Feiguine | |
| 10,782,934 B1 | 9/2020 | Chawda | |
| 10,878,084 B1* | 12/2020 | Voss | G06F 11/1469 |
| 10,936,435 B2 | 3/2021 | Natanzon | |
| 10,990,518 B1* | 4/2021 | Wallace | G06F 16/13 |
| 11,093,290 B1 | 8/2021 | Chopra | |
| 11,366,723 B2 | 6/2022 | Bansod | |
| 11,475,353 B2 | 10/2022 | Rangasamy | |
| 11,494,273 B2 | 11/2022 | Bansod | |
| 11,829,256 B2 | 11/2023 | Bansod | |
| 2016/0094483 A1 | 3/2016 | Johnston | |
| 2017/0046199 A1 | 2/2017 | Kramer | |
| 2019/0050302 A1 | 2/2019 | Juniwal | |
| 2019/0132314 A1 | 5/2019 | Haravu | |
| 2019/0171966 A1* | 6/2019 | Rangasamy | G06F 11/3006 |
| 2019/0235973 A1* | 8/2019 | Brewer | G06F 11/1469 |
| 2019/0320329 A1 | 10/2019 | Gódor | |
| 2020/0012569 A1 | 1/2020 | Natanzon | |
| 2020/0110675 A1 | 4/2020 | Wang | |
| 2020/0169611 A1 | 5/2020 | Kumar | |
| 2020/0264775 A1 | 8/2020 | Natanzon | |
| 2021/0011808 A1 | 1/2021 | Al-Alem | |
| 2021/0109816 A1 | 4/2021 | Enrica | |
| 2021/0312066 A1* | 10/2021 | Hansen | G06F 21/577 |
| 2023/0409405 A1 | 12/2023 | Bansod | |
| 2024/0036986 A1 | 2/2024 | Bansod | |

OTHER PUBLICATIONS

IBM | Think | What is IaC? (available at www.ibm.com/topics/infrastructure-as-code, accessed Nov. 27, 2024). See also Amazon Web Service | What is Infrastructure as Code? (available at aws.amazon.com/what-is/iac/, accessed Nov. 27, 2024).

Puppet | What is Infrastructure as Code (IaC)? Best Practices, Tools, Examples & Why Every Organization Should be Using It | Infrastructure as Code (IaC) vs. Infrastructure as a Service (IaaS) (available at www.puppet.com/blog/what-is-infrastructure-as-code, accessed Nov. 27, 2024) (emphasis added).

TechTarget | Definition | Stephen J. Bigelow, infrastructure as Code (IaC) (available at www.techtarget.com/searchitoperations/definition/Infrastructure-as-Code-IAC, accessed Nov. 27, 2024).

* cited by examiner

APPLICATION ENVIRONMENT RECOVERY USING CLOUD-BASED IMMUTABLE STORAGE DEVICES

TECHNICAL FIELD

The present disclosure relates to computing environments, and more particularly to methods, techniques, and systems to recover an application environment using cloud-based immutable storage devices.

BACKGROUND

With increase in size and scale of businesses, digital transformation of distributed software systems (e.g., multi-tier applications) supporting businesses are prone to continuous changes. Such changes may require creating new applications and upgrading existing ones running on cloud environments. A complex distributed software system may include multiple distributed components (e.g., cloud services) running on multiple compute nodes or platform as a service (PaaS) in a public cloud infrastructure. The state and configurations of these distributed components are collectively known as metadata. The metadata continuously change based on the reliability, scalability, and/or security reasons. Further, interdependencies of these components maybe changing depending on the data flow between these distributed components.

The data infrastructure comprising of data services from cloud services, external data services, or self-managed databases may serve as data providers for the distributed software systems (e.g., business applications). In recent years, security vulnerabilities in such distributed software systems and/or associated cloud services have been attacked by ever-changing and advanced security attacks (e.g., malware, ransomware, and the like) that present constant, new threats to the security of cloud computing services. Such security attacks have caused data corruption or complete encryption, allowed access to and/or the conversion of otherwise prohibited content, information, privileges, and the like, caused disclosure of private information, caused monetary loss, caused reputational damage, and the like. Often, the security vulnerabilities affect both product/service providers and consumers of vulnerable business applications and/or associated cloud services. The longer it takes to recover from cyber-attacks, more the monetary losses and reputation damage for an organization. Moreover, some business-critical cloud application environments may not be completely recovered at all as the backup data from which organizations can recover might also be encrypted by the ransomware attacks.

Figure 1:
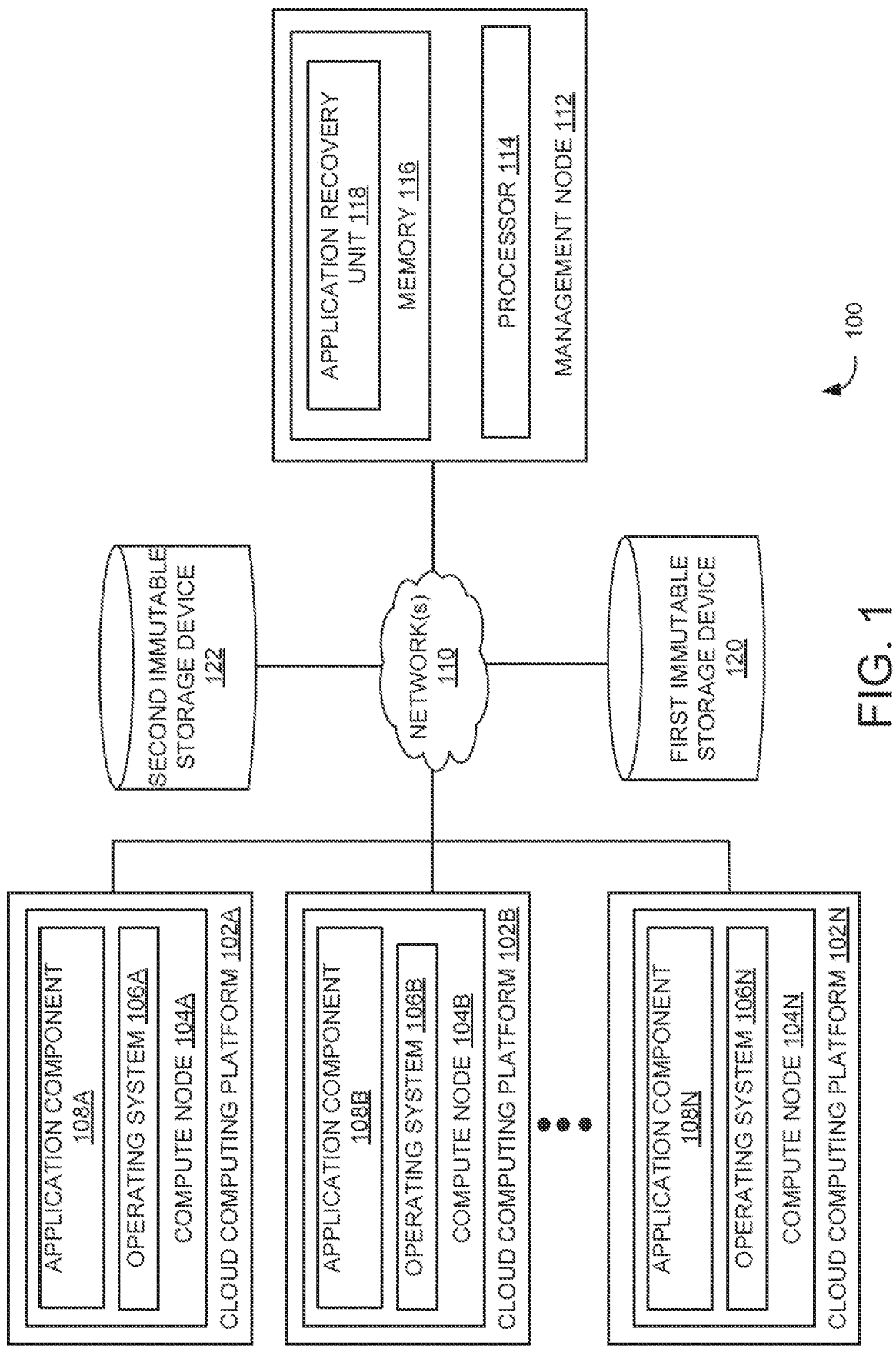
FIG. 1 is a block diagram of an example computing environment, depicting a management node to recover an application environment associated with a distributed software system using cloud-based immutable storage devices.

The drawings described herein are for illustrative purposes and are not intended to limit the scope of the present subject matter in any way.

DETAILED DESCRIPTION

Examples described herein may provide an enhanced computer-based and/or network-based method, technique, and system to recover an application environment using cloud-based immutable storage devices. The paragraphs [0016] to present an overview of the computing environment, existing methods to recover application environments, and drawbacks associated with the existing methods.

Computing environment may be a physical computing environment (e.g., an on-premises enterprise computing environment or a physical data center) and/or virtual computing environment (e.g., a cloud computing environment, a virtualized environment, and the like). The virtual computing environment may be a pool or collection of cloud infrastructure resources designed for enterprise needs. The resources may be a processor (e.g., central processing unit (CPU)), memory (e.g., random-access memory (RAM)), storage (e.g., disk space), and networking (e.g., bandwidth). Further, the virtual computing environment may be a virtual representation of the physical data center, complete with servers, storage clusters, and networking components, all of which may reside in a virtual space being hosted by one or more physical data centers. Example virtual computing environment may include different compute nodes (e.g., physical computers, virtual machines, and/or containers). Further, the computing environment may include multiple application hosts (i.e., physical computers) executing different workloads such as virtual machines, containers, and the like running therein. Each compute node may execute different types of applications and/or operating systems.

Computing resources are physical/virtual computing devices and/or software applications; any or all of which may be offered as a product and/or a service. Example resources may include virtual machines (VMs), containers, software appliances, management agents (e.g., a Common Information Management (CIM) agent, a Simple Network Management Protocol (SNMP) agent, and/or a configuration management agent), cloud services, mobile agents (e.g., mobile software application code and a corresponding application state), and/or business services (e.g., Information Technology Infrastructure library services).

Such computing resources are susceptible to security vulnerabilities or attacks, such as denial of service, privilege elevation, directory traversal, buffer overflow, complete encryption using attacker keys, unauthorized remote or local execution/access, information leakage, and the like. Such attacks can be particularly damaging and costly for enterprises such as corporations, governments, and other organizations. A vulnerability may refer to a weakness or flaw in software, hardware, or firmware of a compute node. Such weakness might allow an adversary to violate the confidentiality, the availability, data exfiltration, and the integrity of a computing system (e.g., a compute node), and its processes or applications.

A complex distributed software system may include multiple layers of distributed components (e.g., cloud services or application components) running on multiple compute nodes or platform as a service (PaaS) in a cloud infrastructure. These components may rely on or are connected to a set of stateful components running on a different computing environments other than the public cloud infrastructures. All the components in the distributed software system may run on cloud service platforms. These environments may not be linked together. For example, some environments may run the production where the main users of the business application may connect and make use of the business software system. Other environments may be used to produce the primary business software system. There may be many such environments for every development and test group that handle a component, a micro-service, or the entire business system.

The state and configurations of the distributed components are collectively known as metadata. The term "application metadata" may refer to any information that describes, gives structure to, organizes, and/or contextualizes application data associated with distributed software system and/or associated cloud services as to facilitate the restoration of the application data. The term "application data" may refer to any data processed, maintained, and/or stored by the distributed software system and/or associated cloud services. Additionally or alternatively, the term "application data" may refer to any data that affects the state of an application. For example, the application may include an e-mail server. Example application metadata may include, but is not limited to, an application version of the application, information descriptive of one or more resources that will or may be typically or possibly used and/or required to launch the application, and the like. Examples of such device resources may include memory, processor, tuner, network connection, graphics, input, output, hardware, firmware, middleware, software, operating system, and/or any other resources.

The metadata continuously changes based on the reliability, scalability, and/or security reasons. Moreover, these components inter-dependencies maybe changing depending on the data flow between the distributed components. The data infrastructure comprising of data services from the cloud services, external data services or self-managed databases may serve as the data providers for the business applications. These data services may be protected with an orchestrated data copy management system that incrementally copies data from the production environments for continuous protection. This orchestrated data copy management system controls the lifecycle of the application components' data to allow users to recover data copies at a particular point-in-time.

In some examples, immutable data vaults built on a cloud object storage system serve as a safe location to protect against cyber-attacks such as, ransomware or rogue users with admin permissions with no possibility to change the original data. In this example, organizations can only request a copy of the data if they want to recover the application data. These immutable data vaults are hosted outside the customer's primary cloud account. Users who demand even better protection, use third party service providers to host these immutable vaults outside of their business domain accounts.

Sophisticated data vaults continuously scan for changes to the data streams to identify possible cyber-attacks to warn users so that they can activate needed organizational cyber security procedures. The data vaults also use a different set of encryptions than users' primary encryption mechanism to further avoid ransomware. Such data vaults may also warn users to change the encryption keys often to further protect their data infrastructure.

Regarding recovery of the application data, industry data suggests that most of the expenses and time are wasted due to the inability to recover entire application environments faster to restore business continuity. Backup systems recover only the application data from the hosted backup vaults at any point-in-time. In such a scenario, recovering entire applications environments, component services configurations, state, dependencies, and relationships at a point-in-time is challenging. For example, the organizations with complicated application environments with many dependencies can take significant amount of time (e.g., more than a year) to recover the full functionality of the system even though they might have recovered their application data after a cyber-attack.

The longer it takes to recover from cyber-attacks, more the monetary losses and reputation damage for an organization. Moreover, some business-critical cloud application environments may not be completely recovered at all as the backup data from which organizations can recover might also be encrypted by the ransomware attacks. It is essential for businesses to protect their cloud services metadata and the applications critical data as immutable away from the production cloud region, not allowing anyone or any services to change the data until the recovery is needed. It is also important to keep the clean data incrementally stored as layers in different location or cloud region or in a different cloud account, isolated by network boundaries to reduce the cost to organizations. After an attack, the ability for the organizations to rebuild isolated recovery environments from the immutable clean metadata and application data vaults offers a way to continue business operations even after a severe cyber-attack. These isolated recovery environments need to be rebuilt to avoid colliding with the infected production environments as those infected environments need to be kept for further forensics.

Examples described herein may provide a management node to recover an application environment using cloud-based immutable storage devices. An example management node may retrieve metadata associated with cloud services of a distributed software system from a cloud-based first immutable storage device responsive to determining an anomaly in the distributed software system. The cloud services are being specific to a first cloud account. Further, the management node may generate cloud platform specific infrastructure as code (IaC) for the distributed software system based on the retrieved metadata. Furthermore, the management node may execute the cloud platform specific IaC to recover an application environment of the distributed software system by orchestrating the application data associated with the cloud services from the cloud-based second immutable storage device. Further, the management node may generate a second cloud account to manage and use the recovered distributed software system.

In the following description, for purposes of explanation, numerous specific details are set forth in order to provide a thorough understanding of the present techniques. However, the example apparatuses, devices, and systems, may be practiced without these specific details. Reference in the specification to "an example" or similar language means that a particular feature, structure, or characteristic described may be included in at least that one example but may not be in other examples.

The terms "immutable data vaults", "immutable vaults" and "immutable storage devices" are used interchangeably throughout the document and refer to a way of protecting data to ensure that the data cannot be tampered with, modified or removed. Further, the terms "cloud services" and "application components" are used interchangeably throughout the document. The application components are part of a distributed software system, which is a collection of independent application components located on different machines that interact with each other to achieve common goals (e.g., a business function).

FIG. 1 is a block diagram of an example computing environment 100, depicting a management node 112 to recover an application environment associated with a distributed software system using cloud-based immutable storage devices (e.g., a first immutable storage device 120 and a second immutable storage device 122). The cloud-based immutable storage devices may be hosted within users' domain cloud account or hosted external to the user's domain cloud account. The distributed software system may refer to a construct which involves various infrastructure parties that act together to enable a business service. An example distributed software system is an online book service including a database tier and a web tier.

Example computing environment 100 may be a networked computing environment such as an enterprise computing environment, a cloud computing environment, a virtualized environment, a cross-cloud computing environment, or the like. As shown in FIG. 1, example computing environment 100 may include multiple cloud computing platforms 102A-102N including corresponding compute nodes 104A-104N. Further, each of compute nodes 104A-104N includes corresponding local operating systems 106A-106N supporting corresponding application components 108A-108N to execute different applications. For example, each of cloud computing platforms 102A-102N may host software development environments.

Further, cloud computing platforms 102A-102N may be in communication with management node 112 over one or more networks 110. Communication may be according to a protocol, which may be a message-based protocol. For example, network 110 can be a managed Internet protocol (IP) network administered by a service provider. For example, network 110 may be implemented using wireless protocols and technologies, such as Wi-Fi, WiMAX, and the like. In other examples, network 110 can also be a packet-switched network such as a local area network, wide area network, metropolitan area network, Internet network, or other similar type of network environment. In yet other examples, network 110 may be a fixed wireless network, a wireless local area network (LAN), a wireless wide area network (WAN), a personal area network (PAN), a virtual private network (VPN), intranet or other suitable network system and includes equipment for receiving and transmitting signals. Network 110 can also have a hard-wired connection to compute nodes 104A-104N.

Example compute nodes 104A-104N may include, but not limited to, physical computing devices, virtual machines, containers, or the like. The virtual machines, in some embodiments, may operate with their own guest operating systems on a physical computing device using resources of the physical computing device virtualized by virtualization software (e.g., a hypervisor, a virtual machine monitor, and the like). A container is a data computer node that runs on top of a host operating system without the need for a hypervisor or separate operating system. Management node 112 may refer to a computing device or computer program (i.e., executing on a computing device) that provides service to compute nodes 104A-104N or application components 108A-108N executing on respective compute nodes 104A-104N.

Application components 108A-108N may run on different compute nodes 104A-104N or cloud computing platforms 102A-102N and communicate through network 110 to achieve a specific business function or task associated with a business service. In the example shown in FIG. 1, the distributed software system is a collection of application components 108A-108N (i.e., cloud services) that provides the business function or task that can be used internally, externally, or with other business applications. The distributed software system may refer to a multi-tier application that divides an enterprise application into two or more application components that may be separately developed and executed. In an example, the tiers in a multi-tier application may include a presentation tier (e.g., provides basic user interface and application access services), an application processing tier (e.g., possesses the core business or application logic), a data access tier (e.g., provides the mechanism used to access and process data), and/or a data tier (e.g., holds and manages data that is at rest).

Examples described in FIG. 1 depict management node 112 in communication with compute nodes 104A-104N, however, in some examples, a group of management nodes or a cluster of management nodes can communicate with multiple compute nodes 104A-104N over one or more networks 110 to provide services to compute nodes 104A-104N. Further, numerous types of applications or distributed software systems may be supported in computing environment 100.

As shown in FIG. 1, management node 112 may execute centralized management services that may be interconnected to manage the resources centrally in computing environment 100. Further, management node 112 may be communicatively connected to compute nodes 104A-104N, first cloud-based immutable storage device 120, and second cloud-based immutable storage device 122 via network 110. Management node 112 may provide a service to the applications running in cloud computing platforms 102A-102N. Further, the management node 112 acts as an intermediator to manage aspects related to the requirements of the application and the services provided by cloud computing platforms 102A-102N.

Further, cloud-based first immutable storage device 120 may maintain a timeline of metadata associated with cloud services (i.e., application components 108A-108N) of a distributed software system deployed in a cloud platform (e.g., cloud service platforms 102A-102N). The cloud services being specific to a first cloud account. The term "cloud account" refers to a unique portal account assigned to a cloud user, which is needed for use of the cloud products (i.e., the distributed software system), and used for purposes of management and billing associated with the cloud products. For example, the first cloud account may enable a user to access and manage the distributed software system and associated cloud services. The cloud account can include multiple cloud service accounts, each cloud service account can be from a different cloud service provider.

The metadata may include information that describes, gives structure to, organizes, and/or contextualizes application data associated with distributed software system and/or associated cloud services as to facilitate the restoration of the application data. The metadata associated with the cloud service may include configuration items (e.g., hardware or software components) that are required to execute the cloud services. In an example, the metadata associated with the cloud services include information selected from the group consisting of a compute node, storage, private IFs, elastic network Interfaces, elastic storage service types, encryption and encryption key management key IDs, security groups, routing table configurations, virtual private cloud resources, virtual private cloud peering, elastic load balancer configurations, auto-scaling groups, subnets, domain naming service configurations, elastic file systems, object storage buckets and configurations, tags associated with resources running in a cloud region, Network Address Translation (NAT) Gateways, and Network Access Control lists. In another example, the metadata may include dependency information associated with the cloud services.

Further, cloud-based second immutable storage device 122 may maintain a timeline of the application data associated with the cloud services. The application data may include content processed, maintained, and/or stored by the distributed software system and/or associated cloud services. In an example, the application data associated with the cloud services may include content that application creates based on user's actions. Such content may require highest level of data integrity, availability and scalability. The content is specific to the user associated with the first cloud account.

Furthermore, management node 112 includes a processor 114. Processor 114 may refer to, for example, a central processing unit (CPU), a semiconductor-based microprocessor, a digital signal processor (DSP) such as a digital image processing unit, or other hardware devices or processing elements suitable to retrieve and execute instructions stored in a storage medium, or suitable combinations thereof. Processor 114 may, for example, include single or multiple cores on a chip, multiple cores across multiple chips, multiple cores across multiple devices, or suitable combinations thereof. Processor 114 may be functional to fetch, decode, and execute instructions as described herein. Furthermore, management node 112 includes memory 116 coupled to processor 114. Example memory 116 includes an application recovery unit 118.

During operation, application recovery unit 118 may identify the cloud services of the distributed software system, which are specific to the first cloud account. Further, application recovery unit 118 may determine relationships between the cloud services of the distributed software system and between the cloud services and other distributed software systems. Furthermore, application recovery unit 118 may store the metadata including the determined relationships associated with the cloud services in cloud-based first immutable storage device 120. Also, application recovery unit 118 may store the application data associated with the cloud services in cloud-based second immutable storage device 122.

In an example, application recovery unit 118 may store the metadata via adding incremental or differential backup metadata associated with a changed portion of the application data along with timestamps to cloud-based first immutable storage device 120. Further, application recovery unit 118 may store the application data via adding incremental or differential backup data associated with the changed portion of the application data along with the timestamps to cloud-based second immutable storage device 122.

Further, application recovery unit 118 may determine an anomaly in the distributed software system or in an associated cloud service. For example, the anomaly may be ransomware, which is malware that employs encryption to hold the user's information at ransom. In this example, the user or organization's critical data is encrypted so that the user cannot access files, databases, or applications.

Responsive to determining the anomaly in the distributed software system or in an associated cloud service, application recovery unit 118 may retrieve the metadata associated with the cloud services from cloud-based first immutable storage device 120. In other examples, application recovery unit 118 may retrieve the metadata associated with the cloud services based on a user input. Further, application recovery unit 118 may generate cloud platform specific infrastructure as code (IaC) for the distributed software system based on the retrieved metadata. The IaC may automate the provisioning of cloud information technology (IT) infrastructure. The IaC may refer to a process of managing and provisioning of cloud IT infrastructure through code instead of through manual processes. Such automation may eliminate the need for developers to manually provision and manage servers, operating systems, database connections, storage, and other infrastructure elements every time they want to develop, test, or deploy software applications.

In an example, application recovery unit 118 may determine relationships between the cloud services of the distributed software system and between the cloud services and other distributed software systems in the cloud platform using the metadata associated with the cloud services. Further, application recovery unit 118 may generate cloud platform specific IaC for the distributed software system using the determined relationships.

Furthermore, application recovery unit 118 may execute the cloud platform specific IaC to recover an application environment of the distributed software system by orchestrating the application data associated with the cloud services from cloud-based second immutable storage device 122. In addition, application recovery unit 118 may generate a second cloud account to manage and use the recovered distributed software system. The second cloud account that is different from the first cloud account. For example, the first cloud account may be "user123@xxx.com". In this example, the second cloud account can be generated as "user123.new@yyy.com".

In an example, application recovery unit 118 may execute the cloud platform specific IaC to recover the application environment including cloud infrastructure, configurations, dependencies, and state of the cloud services to allow users to restore a business operation to a clean copy of the distributed software system prior to the anomaly. In some examples, application recovery unit 118 may execute the cloud platform specific IaC to recover the application environment of the distributed software system in a same cloud region or a different cloud region of the same cloud platform, or in a different cloud platform, depending on the type of anomaly.

In an example, the distributed software system may be created in the same cloud platform if the anomaly is detected in the execution of the distributed software system or associated services. In such scenario, the distributed software system may be redeployed in a different cloud account in another organization domain after identifying and correcting the issue that cause the anomaly. Further, prior version of the distributed software system which was reliable may also be recovered as a rollback. In another example, the distributed software system may be recovered in a in a different cloud account of a cloud platform located in a different geographical region in case of a downtime in a primary region that runs the distributed software system.

In some examples, the functionalities described in FIG. 1, in relation to instructions to implement functions of application recovery unit 118 and any additional instructions described herein in relation to the storage medium, may be implemented as engines or modules including any combination of hardware and programming to implement the functionalities of the modules or engines described herein. The functions of application recovery unit 118 may also be implemented by a processor. In examples described herein, the processor may include, for example, one processor or multiple processors included in a single device or distributed across multiple devices.

Figure 2:
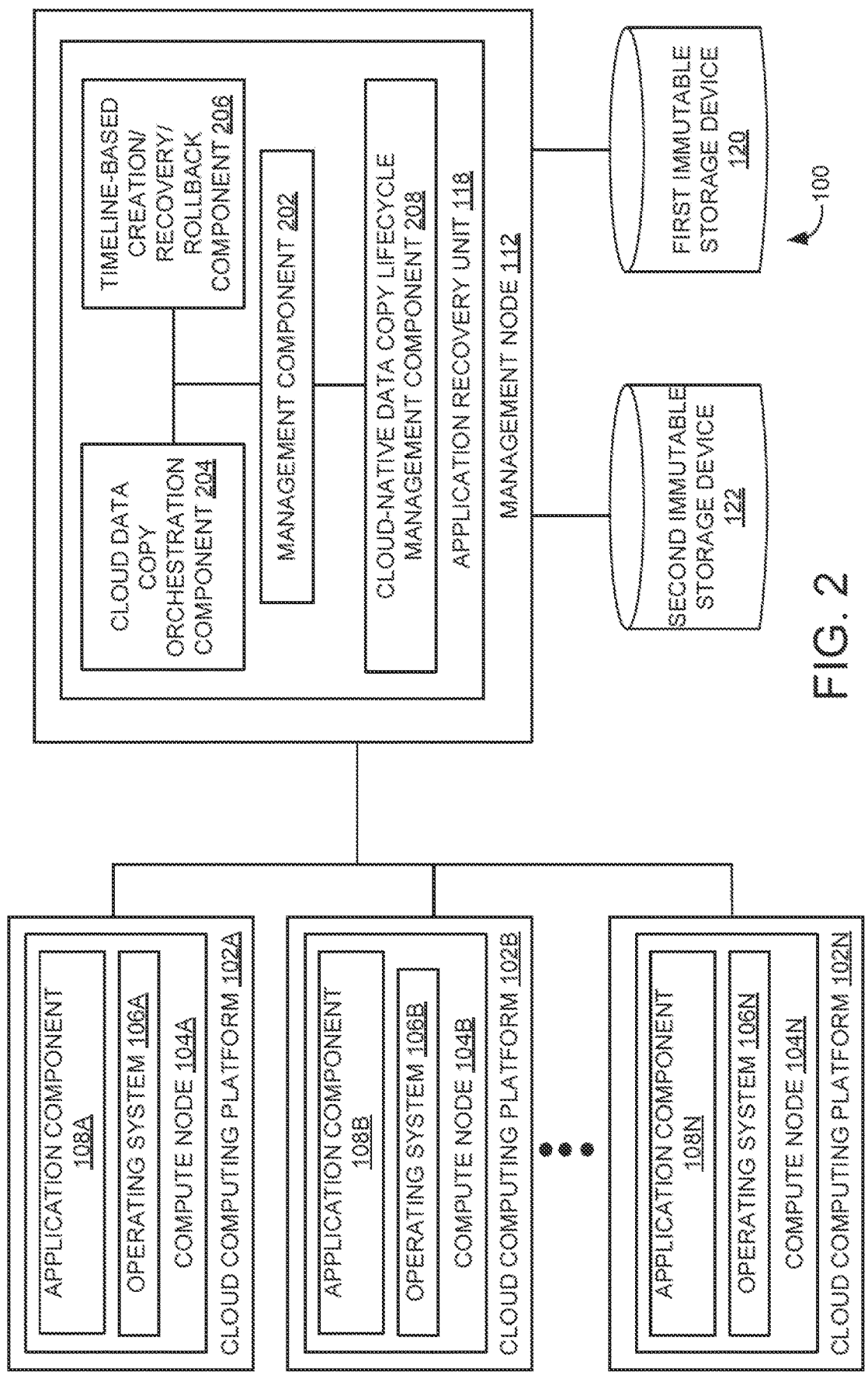
FIG. 2 is a block diagram of an application recovery unit of FIG. 1, depicting additional features.

FIG. 2 is a block diagram of example computing environment 100 of FIG. 1, depicting additional features of application recovery unit 118. Similarly named elements of FIG. 2 may be similar in function and/or structure to elements described with respect to FIG. 1. Management node 112 may include application recovery unit 118 to manage reliability of distributed software systems and/or associated cloud services (i.e., application components 108A-108N) running in cloud computing platforms (e.g., 102A-102N of FIG. 1). Further, components of application recovery unit 118 may include a management component 202, a cloud data copy orchestration component 204, a timeline-based creation/recovery/rollback component 206, and a cloud native data copy lifecycle management component 208. Cloud-based first immutable storage device 120 and cloud-based second immutable storage device 122 can be implemented as part of management node 112 or connected externally to management node 112. Management component 202 may manage the communication between various components of application recovery unit 118 and cloud computing platforms 102A-102N.

Application recovery unit 118 may retrieve information related to the cloud computing platforms 102A-102N connected to management node 112 and the associated cloud services running in them. The retrieved information may be processed at management node 112 to clone application environments for development and test.

During operation, cloud data copy orchestration component 204 may store metadata including cloud infrastructure configuration details related to each cloud service of the distributed software system in cloud-based first immutable storage device 120. Further, cloud data copy orchestration component 204 may store the application data including user data related to each cloud service of the distributed software system in cloud-based second immutable storage device 122. Application data may include information related to a company and its operations, such as sales data, customer contact information, website traffic statistics, and the like.

Further, cloud data copy orchestration component 204 may add incremental or differential backup metadata and incremental or differential backup data associated with a changed portion of the application data along with a timestamp in cloud-based first immutable storage device and cloud-based second immutable storage device 122, respectively. An example system to store the metadata and the application data is described in FIG. 4.

Further, cloud-native data copy lifecycle management component 208 may maintain a timeline of data associated with each cloud service of the distributed software system over time. The data may include metadata and application data associated with each cloud service of the distributed software system. The snapshots of the data (i.e., the metadata and the application data) may be used for creating the distributed software system. Different versions of data snapshots (e.g., metadata snapshots and application data snapshots) may be stored along with a time stamp associated with each version. Further, timeline-based creation/recovery/rollback component 206 may recreate or recover a cloud infrastructure of a distributed software system in the same cloud platform or a different cloud platform using cloud-based first immutable storage device 120 and cloud-based second immutable storage device 122. An example system to recover the application environment including cloud infrastructure of the distributed software system is described in FIG. 5.

Figure 3:
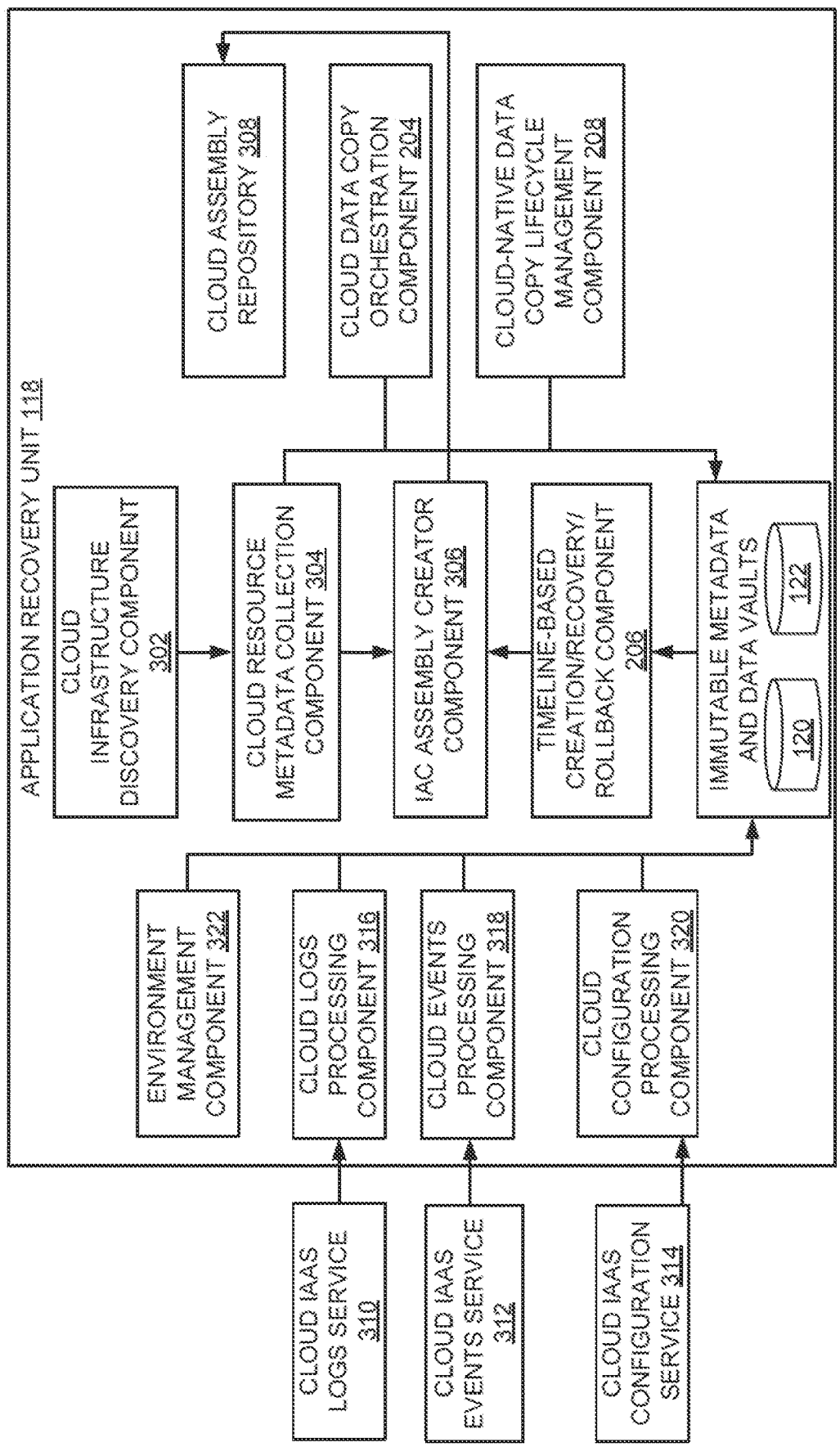
FIG. 3 is a block diagram of the example application recovery unit of FIG. 2.

FIG. 3 is a block diagram 300 of an example application recovery unit 118 of FIG. 2, depicting additional features. Application recovery unit 118 includes cloud infrastructure discovery component 302 that discovers compute services metadata, including but not limited to CPU, memory, storage, private IPs, elastic network Interfaces, elastic storage service type, size, Input Output Processing, encryption and encryption key management key IDs, security groups, routing table configurations, virtual private cloud resources, virtual private cloud peering, elastic load balancer configurations, auto-scaling groups, subnets, domain naming service configurations, object storage buckets and configurations, tags associated with all the resources running in a cloud region, NAT Gateways, Network Access Control lists, etc., of the cloud service platforms 102A-N. The discovered services metadata may be collected by a cloud resource metadata collection component 304.

An IAC assembly creator component 306 may create a cloud assembly which may be made up of a collection of cloud resources discovered by the cloud resource metadata collection component 304. The cloud assemblies are stored as cloud assembly templates in a cloud assembly repository 308. A cloud assembly may be a virtual representation of services, dependencies, external connections, and infrastructure, defined as a code. A cloud assembly encompasses all the cloud infrastructure resources responsible for running software application (e.g., a distributed software system) such as cloud elastic compute, storage, network, security groups, routing tables, virtual private gateways, elastic load balancer configurations, subnets, auto-scaling configurations, storage snapshots, encryption keys, and user defined tags. Multiple such sub-cloud assembly components could be combined into a super-assembly to describe an entire application environment. The application environment is specific to a first cloud account, which is used to access and manage the software application.

Cloud assembly templates may include abstract definitions that specify how cloud resources are created and in which order they are created using cloud infrastructure-as-code. When specific cloud environments are created using the cloud assembly templates, application environment parameters may be given by the users to create instances of the cloud assemblies. Metadata associated with the cloud infrastructure resources and their connectivity and configuration snapshots with timeline may be stored in cloud-based first immutable vault 120. Data associated with the cloud infrastructure resources may be stored in cloud-based second immutable vault 122. Responsive to detecting an anomaly, timeline-based app environment creation/rollback/recovery component 206 recreates or recovers cloud infrastructure of the applications using the metadata and data obtained from cloud-based first immutable vault 120 and cloud-based second immutable vault 122. Timeline-based app environment creation/rollback/recovery component 206 recreates or recovers cloud infrastructure based on user's request.

Furthermore, application recovery unit 118 may allow recovery of entire application environments of the distributed software system using timeline-based app environment creation/rollback/recovery component 206 in a cloud platform located at a different geographical region. Further, timeline-based app environment creation/rollback/recovery component 206 may generate a second cloud account to manage and use the recovered distributed software system.

External services such as cloud IaaS logs service 310, cloud IaaS events service 312, and cloud IaaS configuration service 314 send cloud IaaS resource logs, events and configurations to cloud-based immutable vaults 120 and 122 via cloud logs processing component 316, cloud events processing component 318, and cloud configuration processing component 320 respectively.

Further, the environments of the applications in the cloud service platform may be managed using environment management component 322. Information associated with the environments may be determined and stored in cloud-based immutable vaults 120 and 122. Cloud-native data copy lifecycle management component 208 acts on the cloud IaaS metadata, configuration items, and connectivity to identify the cloud storage objects and manage their lifecycle for IAC assembly creator component 306. The cloud data copy orchestration component 204 orchestrates cloud storage snapshots and services to help timeline-based app environment creation/rollback/recovery component 206 to fully recover the application environment of the distributed software system along with associated data in the second cloud account that is different from the first cloud account.

Figure 4:
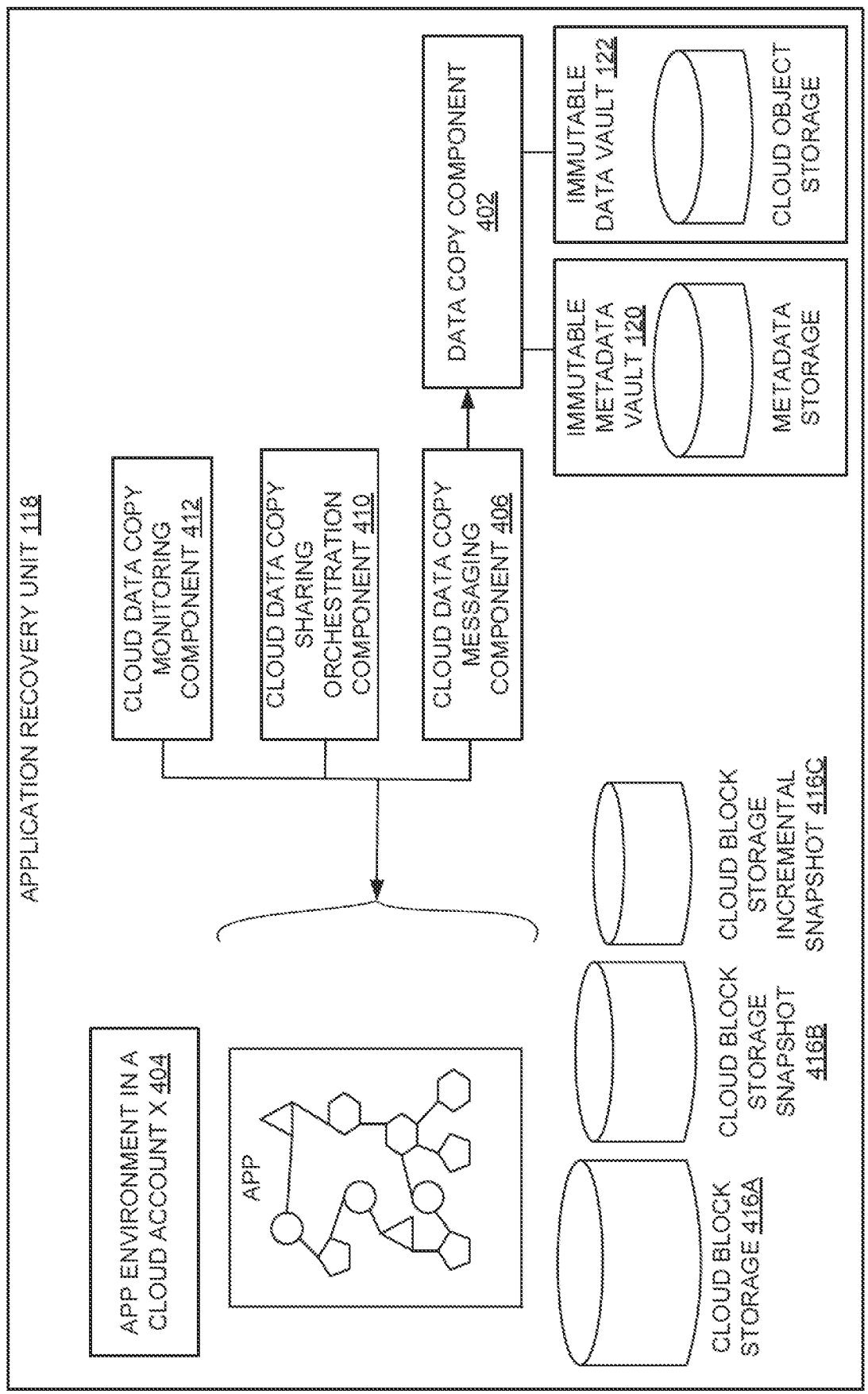
FIG. 4 is a block diagram of the example application recovery unit of FIG. 3, depicting storing data (i.e., metadata and application data) associated with cloud services.

FIG. 4 is a block diagram of example application recovery unit 118 of FIG. 3, depicting storing data (i.e., metadata and application data) associated with cloud services. Herein, a cloud computing tenant organization may describe data lifecycle policies using data lifecycle policies document(s). A tenant organization may be a cloud platform user with a specific cloud account (e.g., cloud account X 404) to access the cloud services. The policies may be described based on organizations backup and recovery strategies in simple Yet Another Mark-up Language (YAML) format or via a user interface.

An application environment created from the cloud infrastructure resources in cloud account X 404 may be analyzed to identify an associated cloud block storage 416A (e.g., application data) attached with compute nodes (e.g., VMs). Cloud assemblies identified with cloud block storage 416A can then be orchestrated using an IaaS application programming interface (API) to make appropriate calls to create and manage cloud block storage snapshot 416B and cloud block storage incremental snapshots 416C. Cloud block storage snapshot 416B may include point in time storage copies. First copy of the snapshot (i.e., 416B) copies the entire data from cloud block storage 416A to a central cloud object storage system (i.e., cloud-based immutable data vault 122). Subsequent cloud block storage incremental snapshot copies 416C may be incrementally different from the previous point in time copy. For example, if cloud block storage 416A with 100 GB is attached to a VM that runs a database system, the first-time snapshot 416B of 100 GB is copied to the cloud object storage system. Subsequently, if the database system changes the data of 5 GB of the 100 GB, a subsequent cloud block storage incremental snapshot 416C may only have 5 GB copied to the object storage system. It also manages the retention of these snapshots in a second cloud IaaS region. All the stored snapshots may be used to create application environments in a different cloud account in the event of migration, cloning, or recovery. All the managed snapshots may be recorded in cloud-based immutable data vault 122. Similarly, the metadata snapshot and incremental metadata snapshots for the metadata are stored in cloud-based immutable metadata vault 120.

In the example shown FIG. 4, cloud-based immutable metadata vault 120 stores metadata associated with cloud services of a distributed software system and cloud-based immutable data vault 122 stores the data associated with cloud services. Data copy component 402 orchestrates data copies (e.g., cloud block storage snapshot 416A) from application environment of the distributed software system in cloud account X 404 based on the messages received from a cloud data copy messaging component 406. Data copy component 402 keeps the data inaccessible, non-modifiable even for the users/services/accounts until multiple permissions are granted to make a copy from immutable data vault 122 in different cloud account Y for processing by a recovery system. Data copy component 402 keeps adding incremental data streams from cloud data copy sharing orchestrator component 410 based on the messages received from cloud data copy monitoring component 412 and cloud data copy messaging component 406. The data copies and the incremental data streams are copied to immutable data vault 122. Similarly, the metadata and incremental metadata associated with the cloud services are stored in immutable metadata vault 120. These incremental data copies and metadata copies are protected by data copy component 402 with multiple cloud object storage and metadata storage locations for high availability and durability for several years based on the policies of the cloud account holder.

Figure 5:
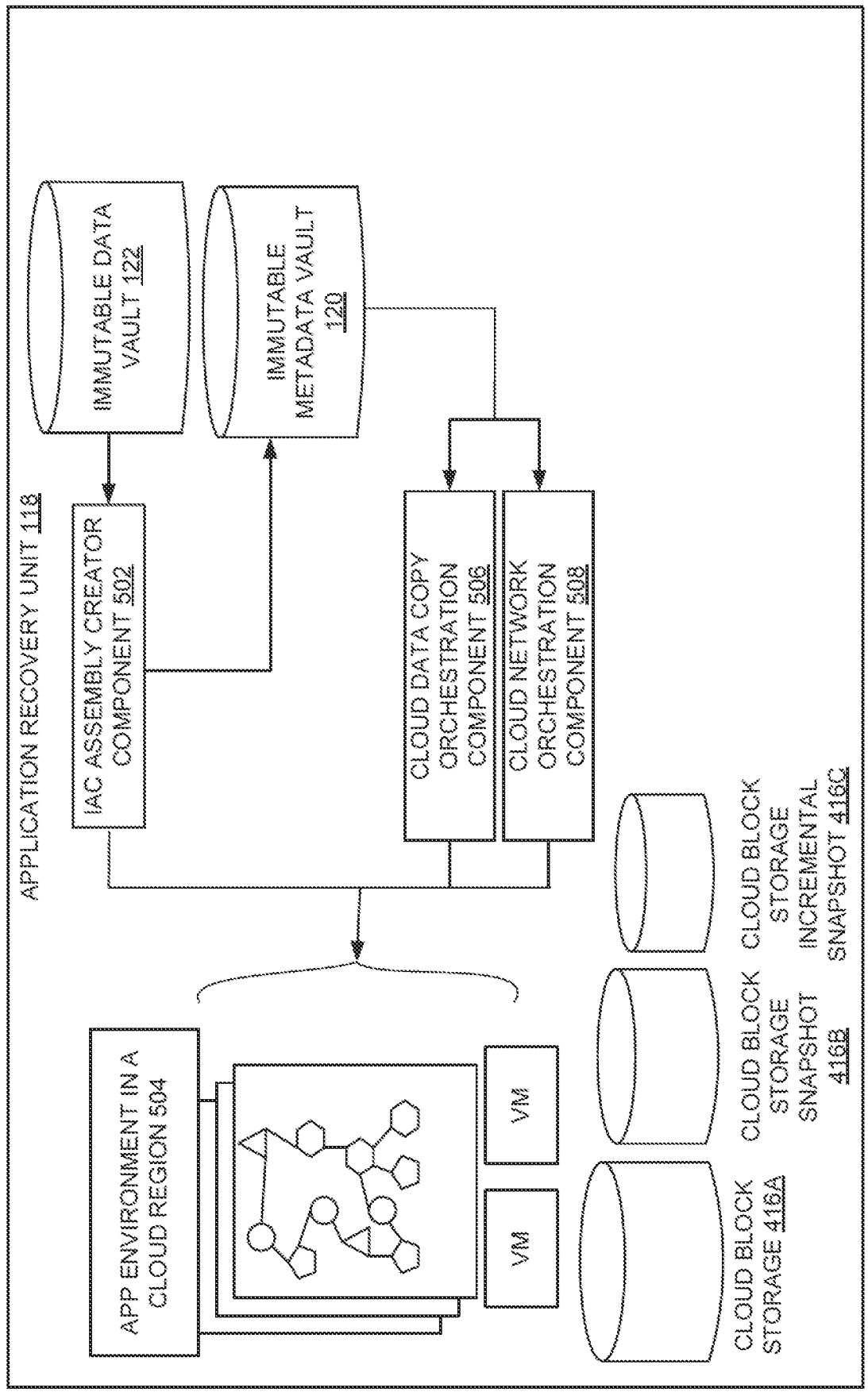
FIG. 5 is a block diagram of the example application recovery unit of FIG. 3, depicting recovering of an application environment using an immutable metadata vault and an immutable data vault.

FIG. 5 is a block diagram of example application recovery unit 118 of FIG. 3, depicting recovering of an application environment using immutable metadata vault 120 and immutable data vault 122. In addition to the complexity explained about the complex and dynamic cloud environment recovery, an externally maintained immutable data vault introduces additional complexity for the site reliability engineers and centralized cloud operations teams. These centralized teams may lack the understanding of the entire application environments to be able to put together after an attack and get the data for all the data infrastructure from external data vaults. The centralized teams may lack the ability to comprehend the point-in-time data archived for various application components in an isolated domain-based cloud account to be able to associate the data components with appropriate cloud workloads. Typically, the centralized teams may be under pressure to restore cloud applications to a working state as soon as possible, for instance, within 15 minutes. It may be difficult to assemble application, network, storage, load balancer, system teams to collect all the information necessary to recover cloud applications with complex dependencies that may have changed dynamically and automatically over a period of time.

Examples described herein may continuously discover, map the dependencies, and automatically write the infrastructure code for the specific public clouds to recover the entire environments to restore the business continuity. Application recovery unit 118 creates application infrastructure and data infrastructure using the metadata from immutable metadata vault 120 based on a user selection and then uses immutable data vault 122 to recover the data at the same point-in-time. As shown in FIG. 5, application recovery unit 118 may include an IAC assembly creator 502, cloud data copy orchestration component 506, and cloud network orchestration component 508. IAC assembly creator 502 may use cloud metadata vault 120 to recreate the application environment in a particular cloud region 504 with all the cloud infrastructure services, configurations, dependencies, and state to allow users to restore business operations to a previous state such as, before a Ransomware attack or natural disaster or to a known working time frame of business applications. Further, cloud data copy orchestration component 506 may orchestrate the data copies 416B and 416C from immutable data vault 122 and synchronize the data copies 416B and 416C with recreated cloud application environment state using the cloud network orchestration component 508. The recreated cloud application environment being specific to the cloud account Y.

Figure 6:
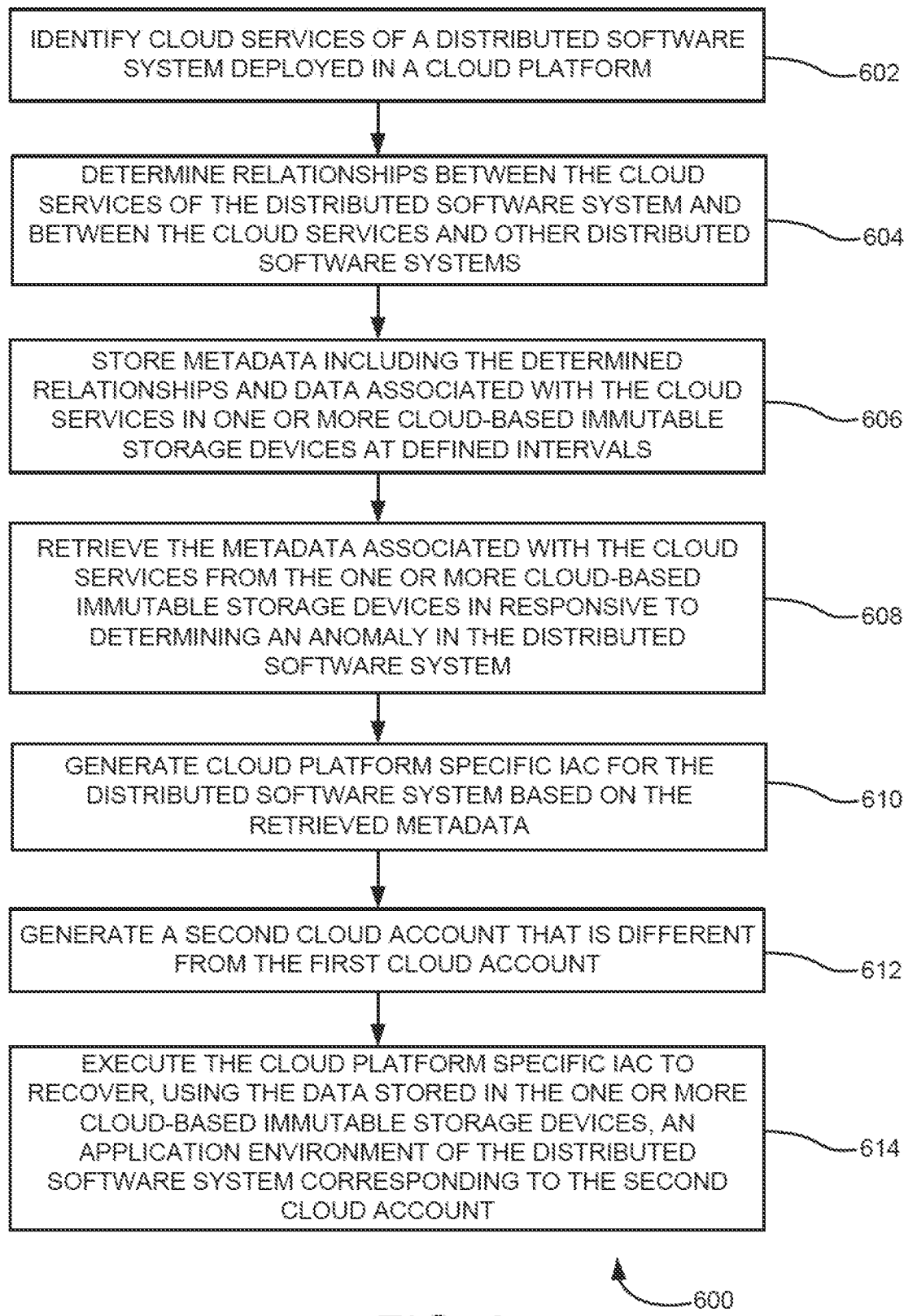
FIG. 6 is a flow diagram illustrating an example computer-implemented method to recover an application environment.

FIG. 6 is a flow diagram illustrating an example computer-implemented method 600 to recover an application environment. At 602, cloud services of a distributed software system deployed in a cloud platform may be identified. In an example, the cloud services may be specific to a first cloud account.

At 604, relationships between the cloud services of the distributed software system and between the cloud services and other distributed software systems may be determined. At 606, metadata including the determined relationships and data associated with the cloud services may be stored in one or more cloud-based immutable storage devices at defined intervals. In an example, storing the metadata and data associated with the cloud services may include storing the metadata associated with the cloud services in a cloud-based first immutable cloud storage device and storing the data associated with the cloud services in a cloud-based second immutable cloud storage device.

The metadata may include configuration items that are required to execute the cloud services. The application data may include data created and managed by the distributed software system. For example, the metadata associated with the cloud services may include information selected from the group consisting of a compute node, storage, private IFs, elastic network Interfaces, elastic storage service types, encryption and encryption key management key IDs, security groups, routing table configurations, virtual private cloud resources, virtual private cloud peering, elastic load balancer configurations, auto-scaling groups, subnets, domain naming service configurations, object storage buckets and configurations, tags associated with resources running in a cloud region, Network Address Translation (NAT) Gateways, and Network Access Control lists.

At a first defined interval, storing the metadata and data associated with the cloud services may include:
storing a metadata snapshot including metadata associated with the cloud services along with a timestamp in a cloud-based first immutable storage device, and
storing a data snapshot including entire data associated with the cloud services along with a timestamp in a cloud-based second immutable storage device.

At subsequent defined intervals, storing the metadata and data associated with the cloud services may include:
storing an incremental metadata snapshot including incremental or differential backup metadata associated with a changed portion of the data along with a timestamp in the cloud-based first immutable storage device, and
storing an incremental data snapshot including the incremental or differential backup data associated with the changed portion of the data along with a timestamp in the cloud-based second immutable storage device.

Responsive to determining an anomaly (e.g., ransomware) in the distributed software system, at 608, the metadata associated with the cloud services may be retrieved from the one or more cloud-based immutable storage devices. At 610, cloud platform specific infrastructure as code (IaC) for the distributed software system may be generated based on the retrieved metadata. In an example, relationships between the cloud services of the distributed software system and between the cloud services and other distributed software systems in the cloud platform may be determined using the metadata associated with the cloud services. Further, the cloud platform specific IaC may be generated for the distributed software system using the determined relationships.

At 612, a second cloud account that is different from the first cloud account may be generated. At 614, the cloud platform specific IaC may be executed to recover, using the data stored in the one or more cloud-based immutable storage devices, an application environment of the distributed software system corresponding to the second cloud account. The second cloud account may be used to access the recovered distributed software system. In an example, the second cloud account may be authenticated prior to recover the application environment of the distributed software system corresponding to the second cloud account.

In an example, the cloud platform specific IaC may be executed to recover the application environment including cloud infrastructure, configurations, dependencies, and state of the cloud services to allow users to restore a business operation to a clean copy of the distributed software system prior to the anomaly. In an example, the cloud platform specific IaC may be executed to recover the application environment of the distributed software system in the same cloud platform or a different cloud platform. For example, the cloud platform specific IaC may be executed to recover the application environment of the distributed software system in a same cloud region or different cloud region of the cloud platform.

Figure 7:
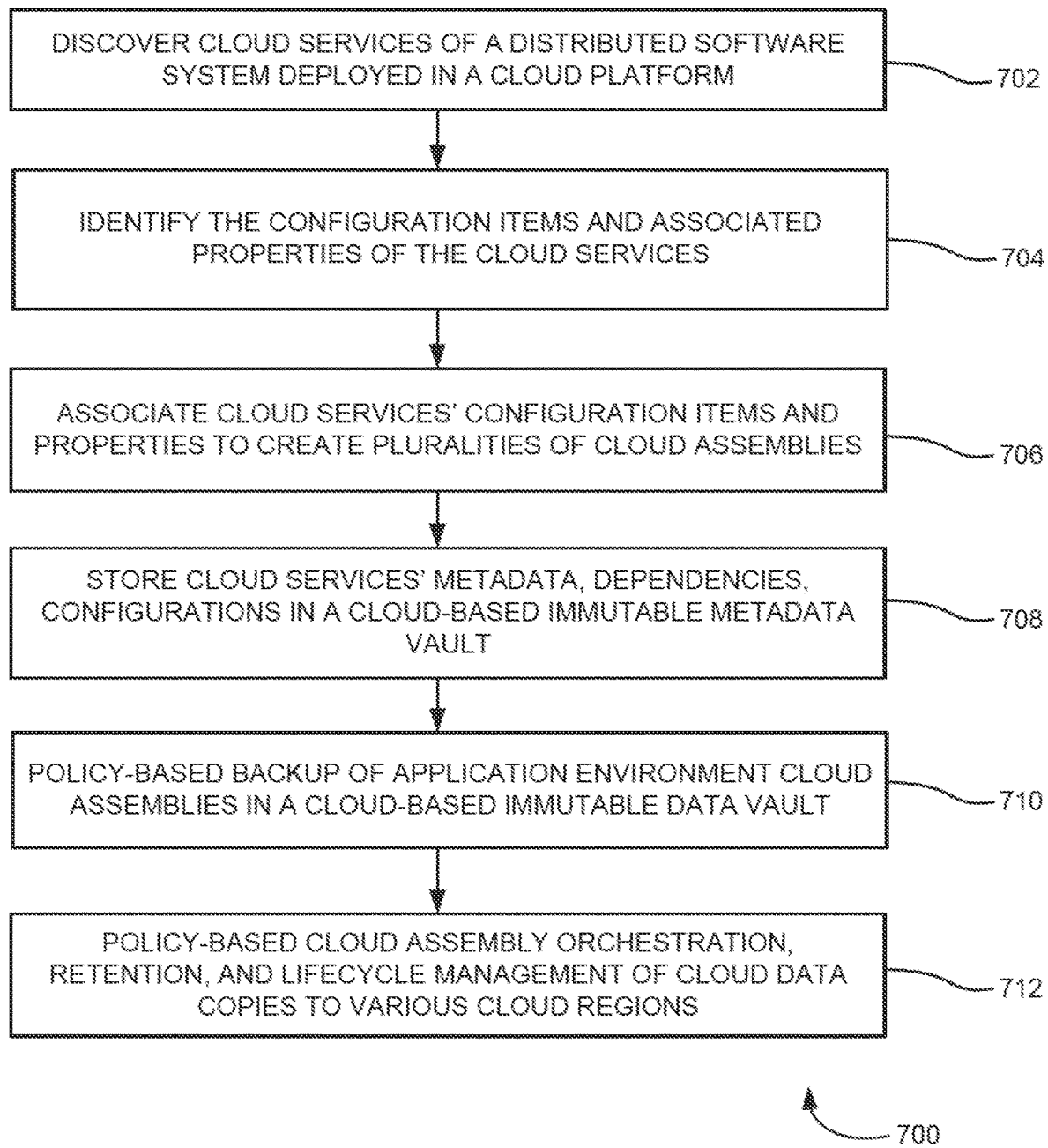
FIG. 7 is a flow diagram illustrating an example computer-implemented method to discover and store metadata and application data associated with cloud services in cloud-based immutable storage devices.

FIG. 7 is a flow diagram illustrating an example computer-implemented method 700 to discover and store metadata and application data associated with cloud services in cloud-based immutable storage devices. At 702, the cloud services of a distributed software system deployed in a cloud platform may be discovered. At 704, configuration items and associated properties of the cloud services may be identified. Examples configuration items may include individual hardware or software components that are required to execute the cloud services.

At 706, the configuration items and properties of the cloud services may be associated to create pluralities of cloud assemblies. At 708, metadata, dependencies, and configuration items associated with the cloud services may be stored in a cloud-based immutable metadata vault based on the cloud assemblies. At 710, the cloud assemblies of an application environment may be backup in a cloud-based immutable data vault according to a policy. At 712, policy-based cloud assembly orchestration, retention, and lifecycle management of cloud data copies to various cloud regions may be performed using the cloud-based immutable metadata vault and cloud-based immutable data vault.

Figure 8:
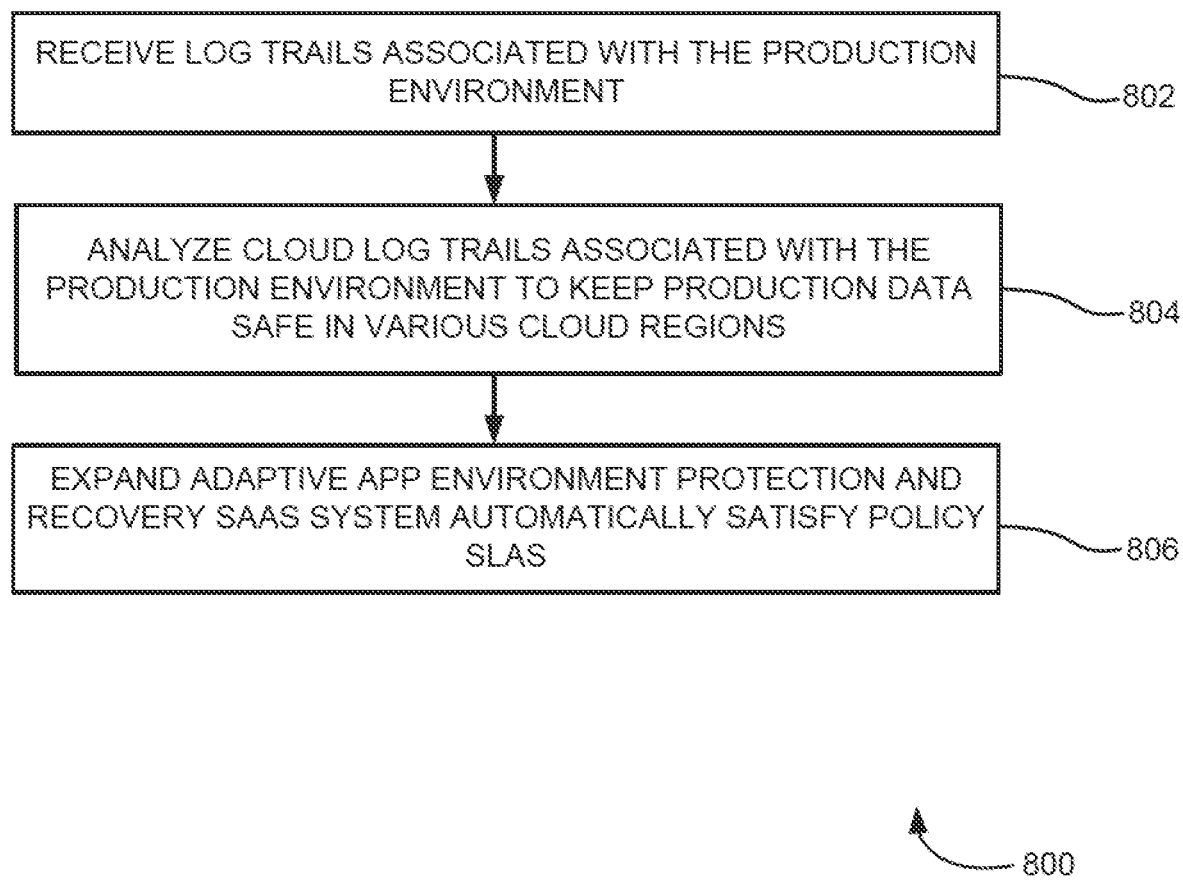
FIG. 8 is a flow diagram illustrating an example computer-implemented method to protect and monitor an application environment.

FIG. 8 is a flow diagram illustrating an example computer-implemented method 800 to protect and monitor the application environment. At 802, log trails associated with the production environment of the distributed software system may be received. At 804, the received log trails associated with the production environment may be analyzed to keep production data safe in various cloud regions. At 806, adaptive application environment protection and recovery software as a service (SaaS) system may be expanded automatically to satisfy policy service level agreements (SLAs).

Figure 9:
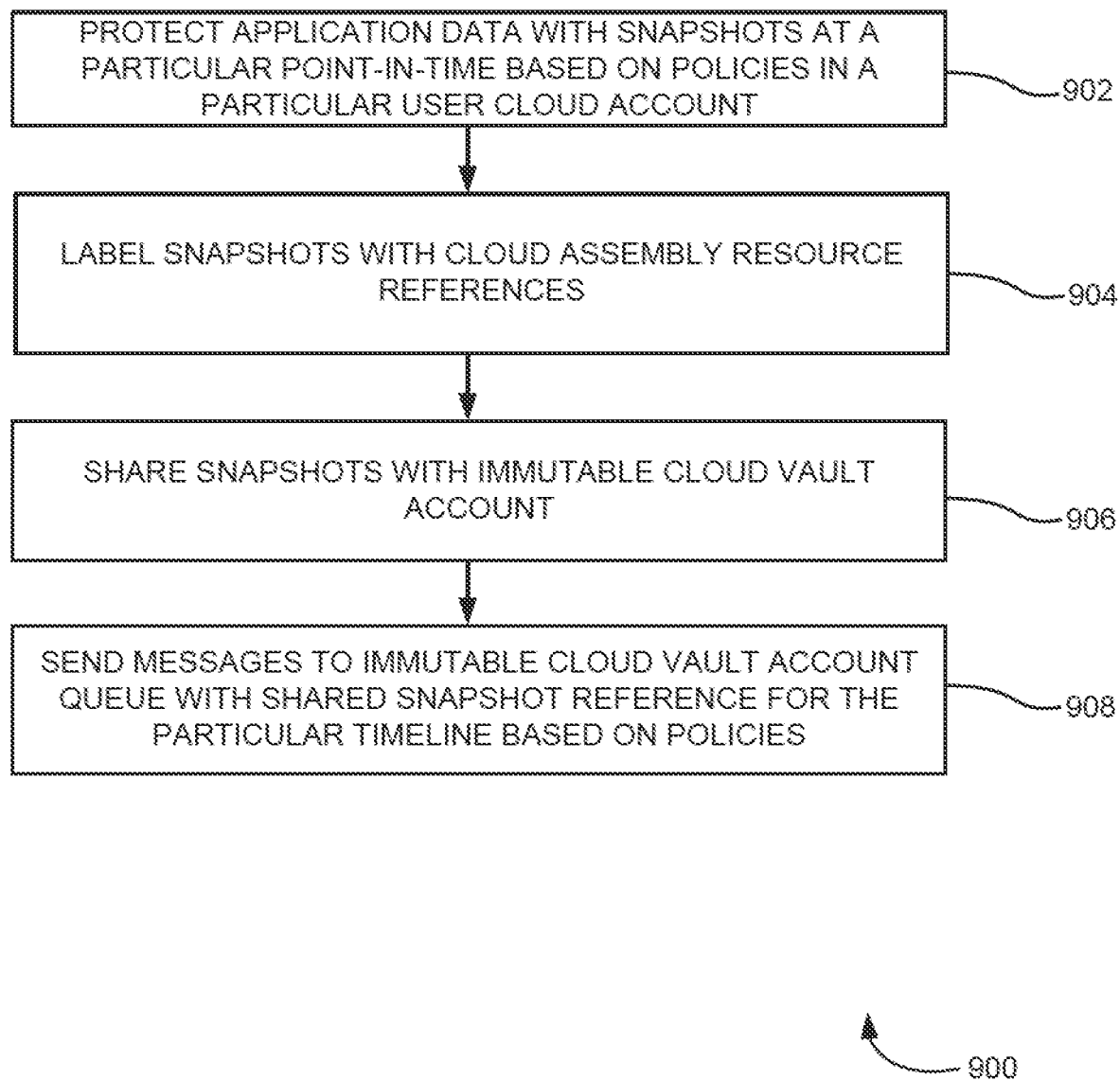
FIG. 9 is a flow diagram illustrating an example computer-implemented method for cloud snapshot sharing with an immutable data vault.

FIG. 9 is a flow diagram illustrating an example computer-implemented method 900 for cloud snapshot sharing with an immutable data vault. At 902, application data may be protected with snapshots at a particular point-in-time based on policies in a particular cloud account of a user. At 904, the snapshots may be labelled with cloud assembly resource references. At 906, the labelled snapshots may be shared with the cloud-based immutable data vault account. At 908, upon sharing the labelled snapshots, messages may be sent to the cloud-based immutable data vault account queue with the shared snapshot references for the particular timeline based on policies. Similarly, metadata of the cloud services may be protected with snapshots at a particular point-in-time in a cloud-based immutable metadata vault account.

Figure 10:
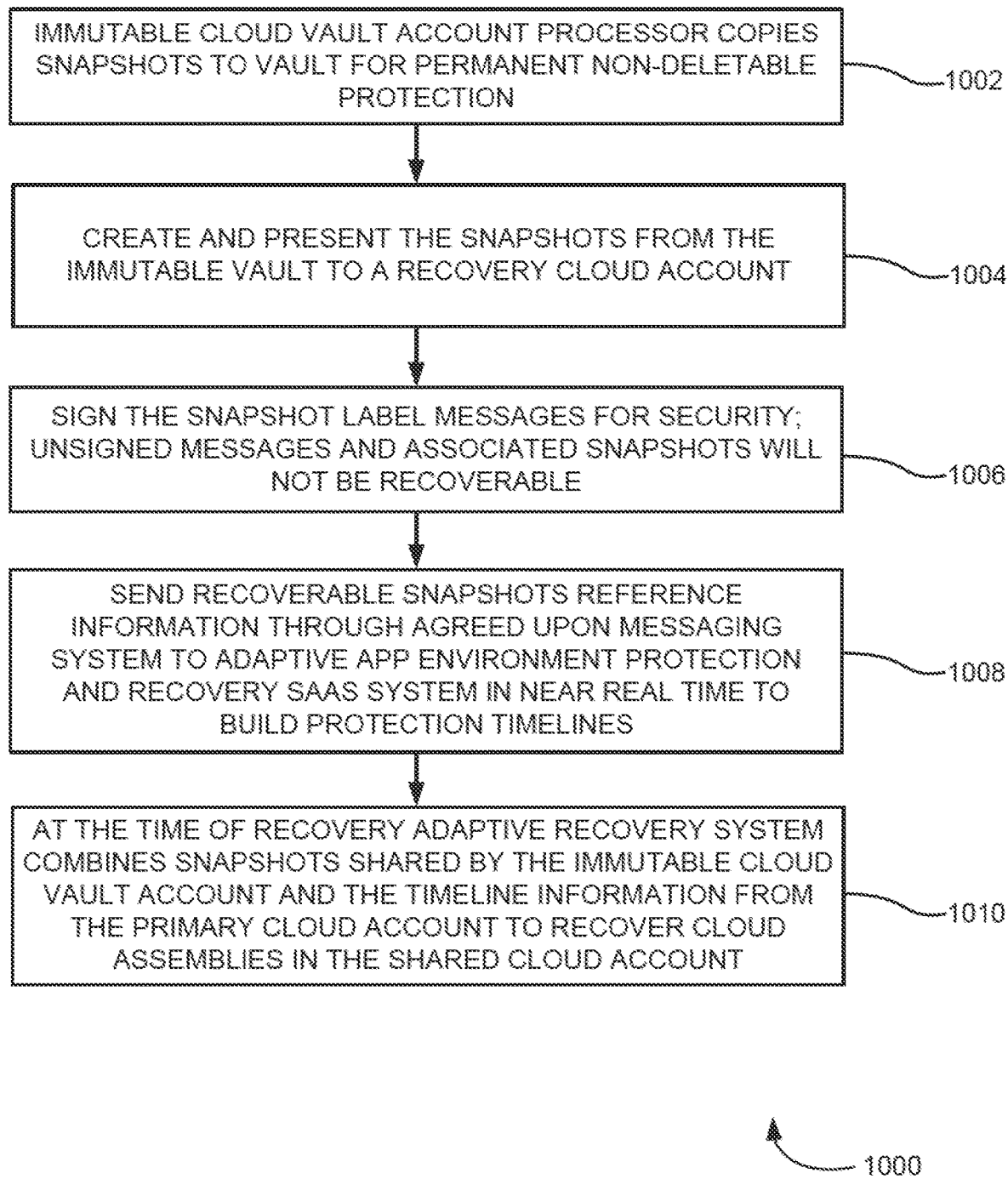
FIG. 10 is a flow diagram illustrating an example computer-implemented method for recovering an application environment from cloud-based immutable vaults.

FIG. 10 is a flow diagram illustrating an example computer-implemented method 1000 for recovering an application environment from the cloud-based immutable vaults. At 1002, snapshots including metadata and application data may be copied to cloud-based immutable vaults for permanent non-deletable protection. At 1004, the snapshots from the immutable vault may be created and presented to a recovery cloud account. At 1006, the snapshot label messages may be signed for security. Unsigned messages and associated snapshots may not be recoverable.

At 1008, recoverable snapshots reference information may be sent through agreed upon messaging system to an application recovery unit in near real-time to build protection timelines. At 1010, at the time of recovery, the application recovery unit combines application data snapshots shared by the immutable data vault and the metadata snapshots (e.g., timeline information) shared by the immutable metadata vault to recover cloud assemblies in the recovery cloud account.

Example methods 600, 700, 800, 900, and 1000 depicted in FIGS. 6, 7, 8, 9, and 10 represent generalized illustrations, and other processes may be added, or existing processes may be removed, modified, or rearranged without departing from the scope and spirit of the present application. In addition, methods 600, 700, 800, 900, and 1000 may represent instructions stored on a computer-readable storage medium that, when executed, may cause a processor to respond, to perform actions, to change states, and/or to make decisions. Alternatively, methods 600, 700, 800, 900, and 1000 may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but the flow chart illustrates functional information to design/fabricate circuits, generate computer-readable instructions, or use a combination of hardware and computer-readable instructions to perform the illustrated processes.

Figure 11:
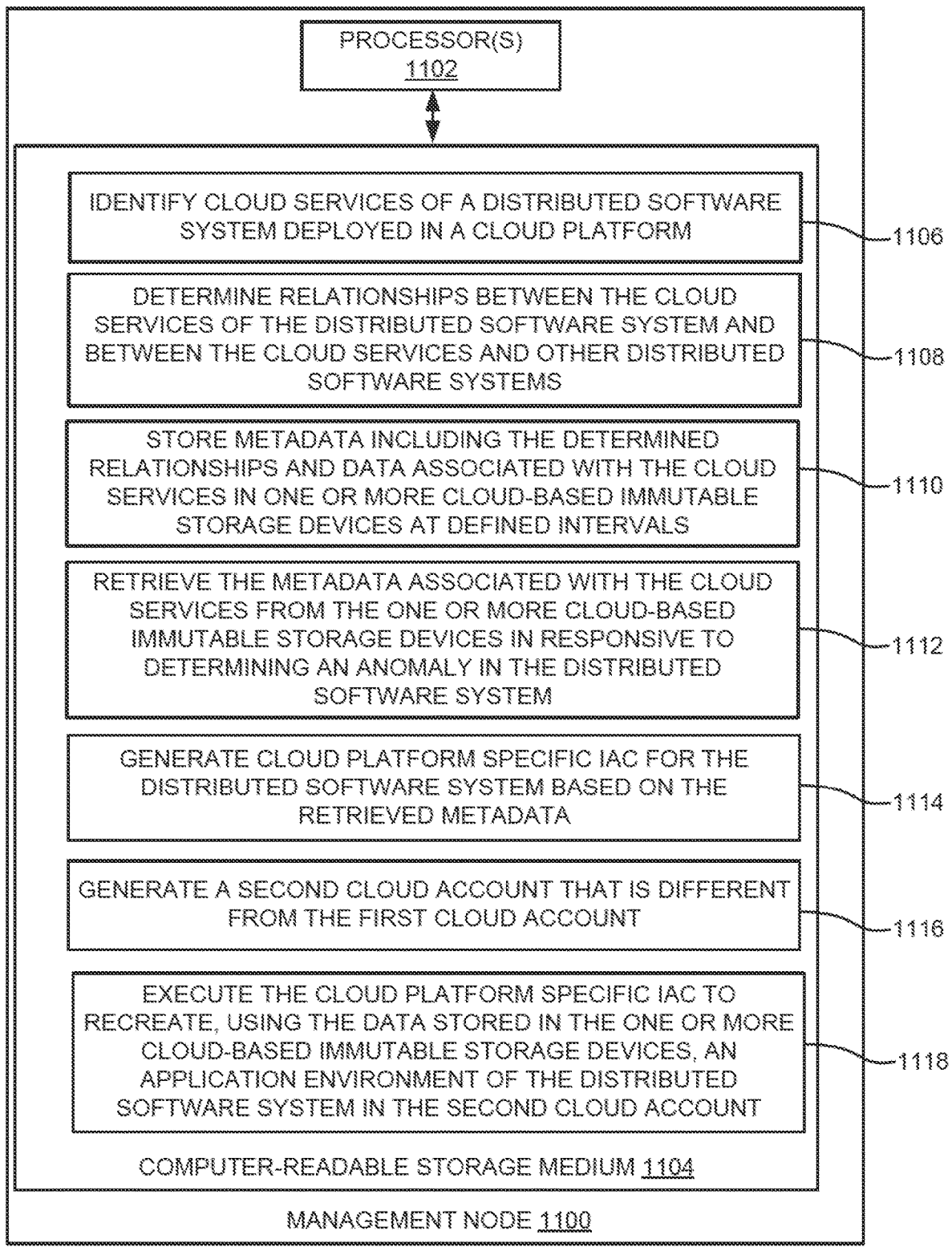
FIG. 11 is a block diagram of an example management node including non-transitory computer-readable storage medium storing instructions to recover an application environment.

FIG. 11 is a block diagram of an example management node 1100 including non-transitory computer-readable storage medium 1104 storing instructions to recover an application environment. Management node 1100 may include a processor 1102 and computer-readable storage medium 1104 communicatively coupled through a system bus. Processor 1102 may be any type of central processing unit (CPU), microprocessor, or processing logic that interprets and executes computer-readable instructions stored in computer-readable storage medium 1104. Computer-readable storage medium 1104 may be a random-access memory (RAM) or another type of dynamic storage device that may store information and computer-readable instructions that may be executed by processor 1102. For example, computer-readable storage medium 1104 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, computer-readable storage medium 1104 may be a non-transitory computer-readable medium. In an example, computer-readable storage medium 1104 may be remote but accessible to management node 1100.

Computer-readable storage medium 1104 may store instructions 1106, 1108, 1110, 1112, 1114, 1116, and 1118. Instructions 1106 may be executed by processor 1102 to identify cloud services of a distributed software system deployed in a cloud platform, the cloud services being specific to a first cloud account.

Instructions 1108 may be executed by processor 1102 to determine relationships between the cloud services of the distributed software system and between the cloud services and other distributed software systems. Instructions 1110 may be executed by processor 1102 to store metadata including the determined relationships and data associated with the cloud services in one or more cloud-based immutable storage devices at defined intervals. In an example, instructions 1110 to store the metadata and data associated with the cloud services may include instructions to store the metadata associated with the cloud services in a cloud-based first immutable cloud storage device and store the data associated with the cloud services in a cloud-based second immutable cloud storage device.

In another example, instructions 1110 to store the metadata and data associated with the cloud services may include instructions to:
  store the metadata associated with the cloud services by adding incremental metadata changes along with associated timestamps, and
  store the data associated with the cloud services by adding incremental data changes along with associated timestamps.

Instructions 1112 may be executed by processor 1102 to retrieve the metadata associated with the cloud services from the one or more cloud-based immutable storage devices in responsive to determining an anomaly in the distributed software system. Instructions 1114 may be executed by processor 1102 to generate cloud platform specific infrastructure as code (IaC) for the distributed software system based on the retrieved metadata. In an example, instructions 1114 to generate the cloud platform specific IaC for the distributed software system may include instructions to:

determine relationships between the cloud services of the distributed software system and between the cloud services and other distributed software systems in the cloud platform using the metadata associated with the cloud services, and generate cloud platform specific IaC for the distributed software system using the determined relationships.

Instructions 1116 may be executed by processor 1102 to generate a second cloud account that is different from the first cloud account. Instructions 1118 may be executed by processor 1102 to execute the cloud platform specific IaC to recreate, using the data stored in the one or more cloud-based immutable storage devices, an application environment of the distributed software system in the second cloud account. In an example, instructions 1118 to execute the cloud platform specific IaC may include instructions to execute the cloud platform specific IaC to recover the application environment including cloud infrastructure, configurations, dependencies, and state of the cloud services to allow users to restore a business operation to a clean copy of the distributed software system prior to the anomaly. The second cloud account may be used to access and manage the restored business operation.

The above-described examples are for the purpose of illustration. Although the above examples have been described in conjunction with example implementations thereof, numerous modifications may be possible without materially departing from the teachings of the subject matter described herein. Other substitutions, modifications, and changes may be made without departing from the spirit of the subject matter. Also, the features disclosed in this specification (including any accompanying claims, abstract, and drawings), and any method or process so disclosed, may be combined in any combination, except combinations where some of such features are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus. In addition, the terms "first" and "second" are used to identify individual elements and may not meant to designate an order or number of those elements.

The present description has been shown and described with reference to the foregoing examples. It is understood, however, that other forms, details, and examples can be made without departing from the spirit and scope of the present subject matter that is defined in the following claims.

What is claimed is:

1. A computer-implemented method comprising:
    identifying cloud services of a distributed software system deployed in a cloud platform, wherein the cloud services are specific to a first cloud account of the cloud platform;
    determining relationships including: among the cloud services of the distributed software system, as well as between the cloud services of the distributed software system and other distributed software systems in the cloud platform, wherein the relationships include a first dependency between a first cloud service and a second cloud service;
    creating a cloud assembly that is based on the relationships and is further based on associating properties of the cloud services and configuration items required to execute each of the cloud services:
    storing metadata associated with the cloud services, wherein the metadata includes the relationships, in one or more cloud-based immutable storage devices;
    backing up the cloud assembly in the one or more cloud-based immutable storage devices;
    storing application data associated with the cloud services in the one or more cloud-based immutable storage devices, wherein the application data was created and managed by one or more of the cloud services; and
    responsive to determining an anomaly in the distributed software system:
        (a) identifying a point in time before a time of the anomaly, and
        (b) retrieving, from the metadata stored in the one or more cloud-based immutable storage devices, first metadata that is associated with the point in time, and
        (c) generating cloud platform specific infrastructure as code (IaC) for the distributed software system based on the first metadata retrieved from the one or more cloud-based immutable storage devices, wherein the IaC is based, at least in part, on the cloud assembly that was backed up, and
        (d) executing, in the cloud platform, the cloud platform specific IaC to recover, into a second cloud account that is distinct from the first cloud account:
            (A) an application environment of the distributed software system corresponding to the cloud assembly at the point in time, wherein the application environment includes the cloud services and the first dependency, and
            (B) the application data, which is retrieved from the one or more cloud-based immutable storage devices,
            wherein executing the cloud platform specific IaC comprises synchronizing the application data with the application environment corresponding to the point in time.

2. The computer-implemented method of claim 1, wherein executing the cloud platform specific IaC to recover the application environment of the distributed software system comprises:
    recovering cloud infrastructure, configurations, dependencies, and state of the cloud services that were captured in the cloud assembly,
    wherein the recovered application environment in the second cloud account restores, in the second cloud account, a clean copy of the distributed software system corresponding to the point in time.

3. The computer-implemented method of claim 1, wherein generating the cloud platform specific IaC for the distributed software system is further based on the relationships among the cloud services of the distributed software system.

4. The computer-implemented method of claim 1, wherein storing the metadata and application data associated with the cloud services comprises:
    storing the metadata associated with the cloud services in a cloud-based first immutable cloud storage device; and
    storing the application data associated with the cloud services in a cloud-based second immutable cloud storage device.

5. The computer-implemented method of claim 1, wherein executing the cloud platform specific IaC causes the application environment of the distributed software system to recover in one of: a same cloud platform and a different cloud platform.

6. The computer-implemented method of claim 1, wherein executing the cloud platform specific IaC causes the application environment of the distributed software system to recover in one of: a same cloud region of the cloud platform and a different cloud region of the cloud platform.

7. The computer-implemented method of claim 1, wherein storing the metadata and application data associated with the cloud services comprises:
- at a first defined interval:
  - storing a metadata snapshot, including metadata associated with the cloud services along with a timestamp, in a cloud-based first immutable storage device; and
  - storing an application data snapshot, including entire data associated with the cloud services along with a timestamp, in a cloud-based second immutable storage device; and
- at subsequent defined intervals:
  - storing an incremental metadata snapshot, including incremental metadata associated with a changed portion of the application data along with a timestamp, in the cloud-based first immutable storage device; and
  - storing an incremental application data snapshot, including the changed portion of the application data along with a timestamp, in the cloud-based second immutable storage device.

8. The computer-implemented method of claim 1, wherein the metadata associated with the cloud services comprises information about one or more of: a compute node, storage, private IPs, elastic network Interfaces, elastic storage service types, encryption and encryption key management key IDs, security groups, routing table configurations, virtual private cloud resources, virtual private cloud peering, elastic load balancer configurations, auto-scaling groups, subnets, domain naming service configurations, object storage buckets and configurations, tags associated with resources running in a cloud region, Network Address Translation (NAT) Gateways, and Network Access Control lists.

9. The computer-implemented method of claim 1, further comprising: authenticating the second cloud account prior to recovering the application environment of the distributed software system in the second cloud account.

\* \* \* \* \*